April 21, 1964   R. D. SMITH   3,129,683
SAFETY EQUIPMENT HOUSING FOR SHIPS AND AIRPLANES
Filed April 17, 1963   2 Sheets-Sheet 1
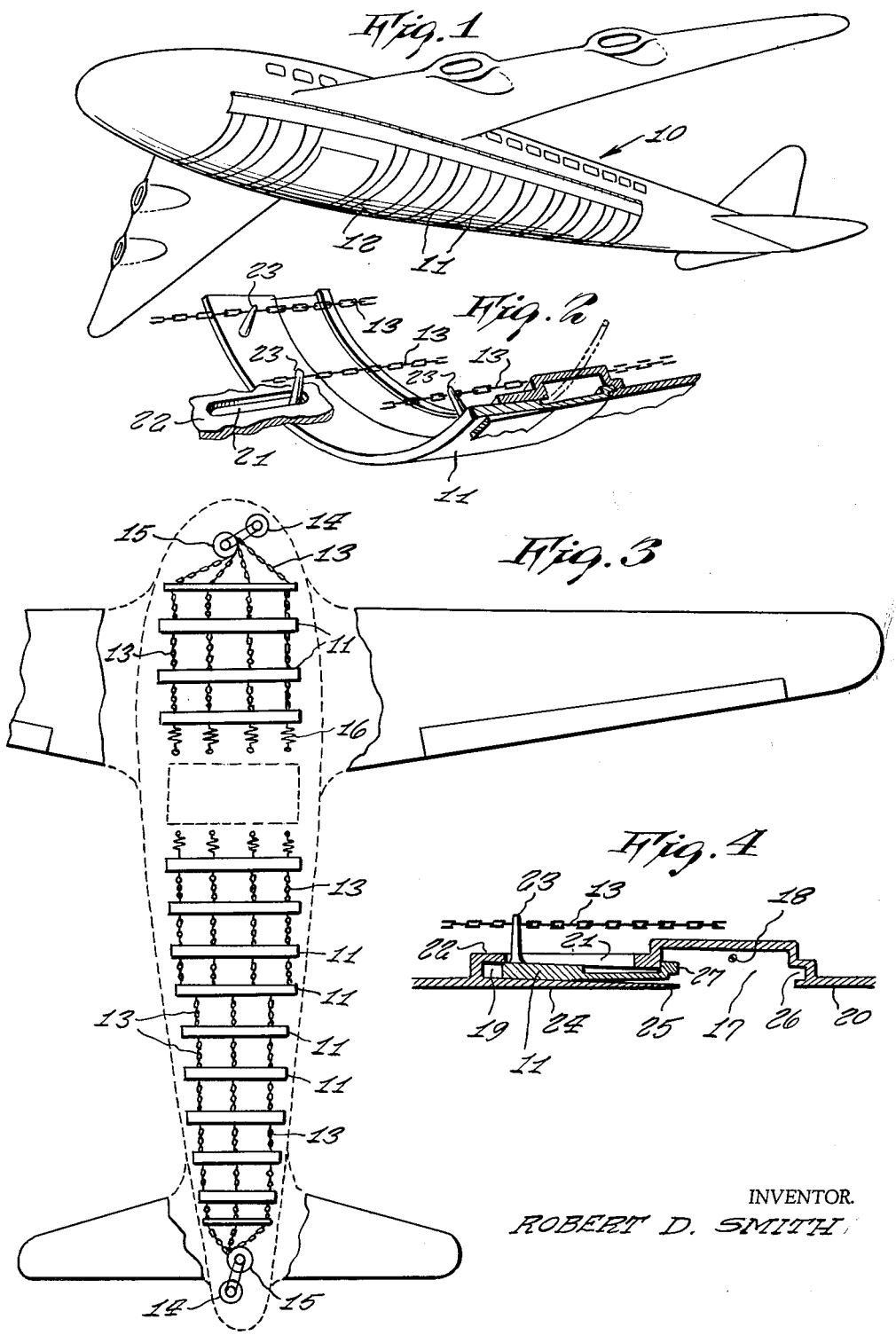
INVENTOR.
ROBERT D. SMITH

INVENTOR.
ROBERT D. SMITH

United States Patent Office 3,129,683
Patented Apr. 21, 1964

3,129,683
SAFETY EQUIPMENT HOUSING FOR
SHIPS AND AIRPLANES
Robert D. Smith, 2742 E. Tremont Ave., Bronx, N.Y.
Filed Apr. 17, 1963, Ser. No. 273,688
4 Claims. (Cl. 114—68)

This invention relates generally to ship and airplane hulls. More specifically it relates to safety equipment housings in ship and airplane hulls such as are described in the applicant's patent applications Serial Nos. 237,590; 237,631, now Patent No. 3,100,096, and 253,840.

It is an object of the invention to provide a housing for safety equipment in a ship hull or airplane fuselage which has an improved door and door-operating mechanism. It will be noted that in the above-named patent applications structure was shown wherein: an airplane or ship hull is provided with a plurality of spaced apart doors along the hull for access to chambers containing safety equipment to be exposed in time when the airplane or ship is in danger of disaster. It will be noted that applicant has provided structures whereby the streamlined contour of the airplane fuselage and ship hull remained unbroken when the craft was in normal operation. Thus access doors have been shown for such chambers which must necessarily be of a nature to be operative between a streamlined position and a position exposing the chambers.

It is accordingly another object of the present invention to provide access doors for safety equiment housings on a ship or airplane hull, each of which is slideable in a single, simple direction between an open and closed position thereby requiring relatively uncomcated operative mechanism to produce such movement.

Another object of the present invention is to provide access doors for safety equipment housings which retain the hull in a strong condition against natural elements when the doors are in closed streamlined position.

These and other objects will be readily apparent upon a study of the following specifications and accompanying drawings wherein:

FIGURE 1 is a bottom perspective view of an airplane incorporating the present invention.

FIGURE 2 is a perspective view in cross section of one of the access doors and associate structure.

FIGURE 3 is a schematic diagram of the access door systems.

FIGURE 4 is a cross sectional view relatively similar to FIGURE 2 showing the door in an alternate position.

Figure 5:
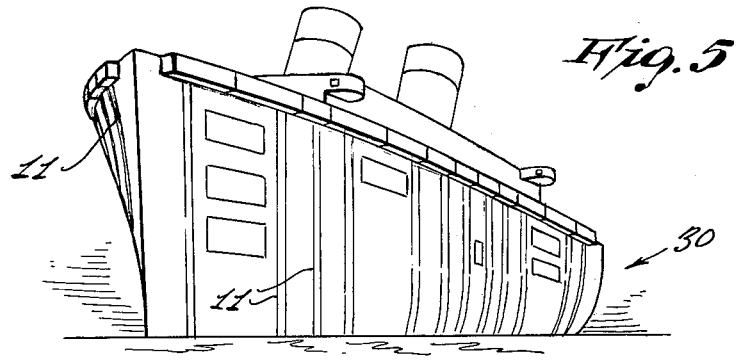
FIGURE 5 is a perspective view of a ship incorporating the present invention.
Figure 6:
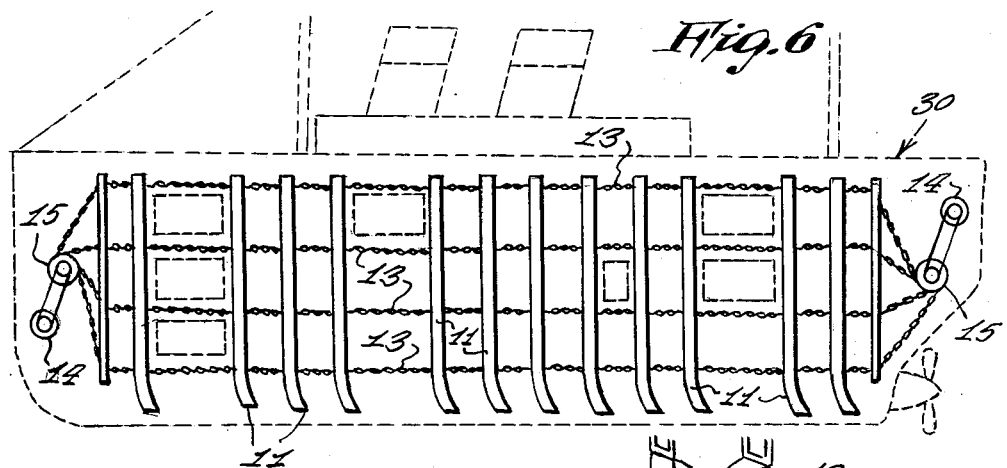
FIGURE 6 is a schematic diagram of the access door system thereof.

Referring now to the drawing in detail, and more particularly to FIGURES 1 through 4, there is shown an airplane fuselage 10 according to the present invention wherein there are a plurality of doors 11 on the underside 12 of the hull. The doors are spaced apart and attached to each other by chains 13 which are movable longitudinally by means of motors 14 operating winch drums 15 at the ends of the craft. Springs 16 are provided to return the doors into streamlined fuselage position.

The hull has a plurality of spaced apart transverse extending chambers 17 formed on the underside of the fuselage each of which is associated with one of the doors. Safety equipment 18 is contained within the chamber. A recess 19 is provided on one side of the chamber into which the door is slideable as shown in FIGURE 4. It is to be noted that the recess is angularly inclined relative to the outer side 20 of the underside, thus causing the door to be moved slightly upward when being drawn into the recess. The recess has a slot 21 in its upper wall 22 and a post 23 affixed to the door extends therethrough. The chain 13 is attached to each of the posts as shown in FIGURE 2. The outer wall 24 is tapered to a relatively thin edge 25 so as to maintain a streamlined contour of the hull. A groove 26 is provided to receive and securely hold edge 27 of the door when in streamlined position.

In operative use, when there is danger of the airplane falling into the sea or upon the ground, the pilot depresses a button to start up motors 14 causing the doors to be moved from the position shown in FIGURE 2 to the position shown in FIGURE 4. Thus the safety equipment within the chambers is exposed for use.

Figure 7:
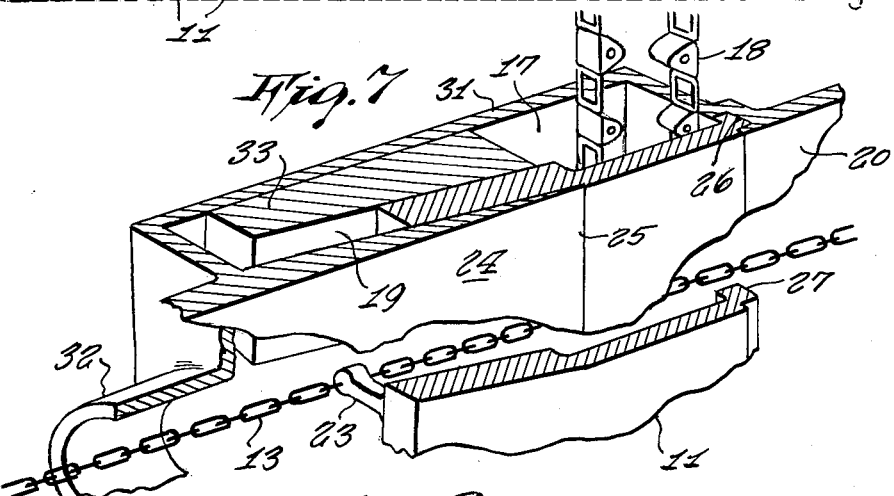
FIGURE 7 is an enlarged perspective view in cross section showing one of the doors and associate hull structure.
Figure 8:
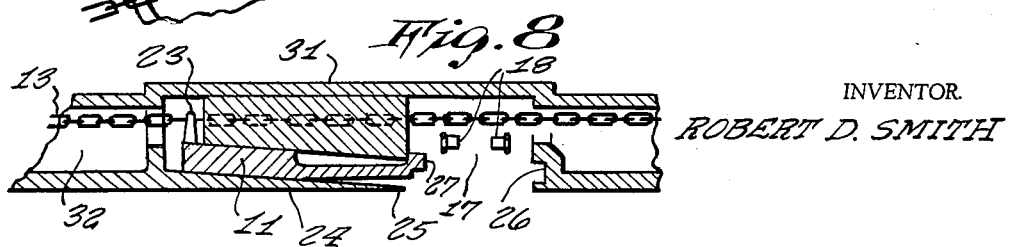
FIGURE 8 is a cross sectional view relatively similar to FIGURE 7 showing the door in an alternate position.

In FIGURES 5 through 8 the same mechanism is shown adapted for use on a ship hull 30. In FIGURES 5 through 8 like parts to the structure described above are indicated with like numbers. It is to be noted that the problem of maintaining sea water outside of the hull makes necessary that the slot 21 in the upper wall 22 described above be substituted with the following construction. In the ship construction the chambers extend from the topside down to the keel instead of straddling the underside as on the airplane. Thus as shown in FIGURE 7 the chamber 17 has a solid rear wall 31 so to keep out seawater. In order that the chain may communicate between chambers a plurality of horizontal pipes 32 extend between the chambers and the chains pass through the pipes thus permitting opening and closing movement of the doors at every chamber simultaneously. In this form of the construction a spacer block 33 is located between the rear wall and the door, the front side of the block being angled to produce the angled recess described above.

Due to the excessive weight of this construction in a ship the spring 16 described above is substituted with another motor 14 and winch drum 15 to return the doors into a closed position.

Thus there has been shown a door construction which is rugged in strength, which operates in a single plane of direction and which does not interfere with the streamlined contour of a hull.

While various changes may be made in the detail construction it shall be noted that such changes shall be within the spirit and scope of the present invention as defined by the appended claims.

Having thus set forth my invention what I claim as new and desire to secure by Letters Patent of the United States is:

1. In a craft for flight or movement on the surface of the sea, the combination of a hull, a plurality of spaced apart chambers recessed into the outer side of said hull, each of said chambers having a door, said door in a closed position of said chamber forming an unbroken continued streamlined contour of the outer side of said hull, each of said doors being slideable in a singular angular direction respective to the said outer side, said direction being inwardly within the outline of said hull, and means for sliding said doors.

2. In a craft for flight or movement on the surface of the sea, the combination as set forth in claim 1 wherein each of said chambers has a recess adjacent one side of said chamber said recess communicating with said chamber, said recess slideably receiving said door when in an open position and said recess extending angularly respective to said outer side of said hull.

3. In a craft for flight or movement on the surface of the sea, the combination as set forth in claim 2 wherein the outer wall of said recess is tapered to a relatively thin edge due to said angular recess to form said unbroken continued streamlined contour of the outer side of said hull.

4. In a craft for flight or movement on the surface of the sea the combination as set forth in claim 3 wherein a plurality of pipes communicate between said chambers and said means for sliding said doors comprises motor driven chains, said chains extending through said pipes to isolate said chains outside of the interior of said hull.

References Cited in the file of this patent

UNITED STATES PATENTS

| | | |
|---|---|---|
| 3,100,096 | Smith | Aug. 6, 1963 |
| 3,107,616 | Boaz et al. | Oct. 22, 1963 |